United States Patent
Xu et al.

(10) Patent No.: US 11,645,359 B1
(45) Date of Patent: May 9, 2023

(54) PIECEWISE LINEARIZATION OF MULTIVARIABLE DATA

(71) Applicant: SAS Institute Inc., Cary, NC (US)

(72) Inventors: Wei Xu, Beijing (CN); Robert William Pratt, Apex, NC (US); Natalia Summerville, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/938,692

(22) Filed: Oct. 7, 2022

Related U.S. Application Data

(60) Provisional application No. 63/398,832, filed on Aug. 17, 2022, provisional application No. 63/354,420, filed on Jun. 22, 2022.

(51) Int. Cl.
*G06F 17/18* (2006.01)

(52) U.S. Cl.
CPC .................... *G06F 17/18* (2013.01)

(58) Field of Classification Search
CPC ....................................... G06F 17/18
USPC ....................................... 708/207
See application file for complete search history.

(56) References Cited

FOREIGN PATENT DOCUMENTS

WO    WO-2017007845 A1 *   1/2017   ......... G01N 33/2823

OTHER PUBLICATIONS

Lin, Chii-Dean. Paper 3277-2019, Conducting Tests in Multivariate Regression. San Diego State University. 2019. pp. 1-13.
SAS Institute Inc. SAS® Optimization: Mathematical Optimization Programming Guide. Nov. 18, 2020. Cary, NC: SAS Institute Inc. pp. 1-304.
Dynamic Programming. Wikipedia. https://en.wikipedia.org/w/index.php?title=Dynamic_programming&oldid=1104487387. Last edited Aug. 15, 2022. pp. 1-18.
General Linear Model. Wikipedia. https://en.wikipedia.org/w/index.php?title=General_linear_model&oldid=1102725280. Last edited Aug. 6, 2022. pp. 1-4.
Linear Regression. Wikipedia. https://en.wikipedia.org/w/index.php?title=General_linear_model&oldid=1102725280. Last edited Aug. 27, 2022. pp. 1-18.

(Continued)

*Primary Examiner* — Tan V Mai
(74) *Attorney, Agent, or Firm* — Bell & Manning, LLC

(57) ABSTRACT

A computing device selects a piecewise linear regression model for multivariable data. A hyperplane is fit to observation vectors using a linear multivariable regression. A baseline fit quality measure is computed for the fit hyperplane. For each independent variable, the observation vectors are sorted, contiguous segments to evaluate are defined, for each contiguous segment, a segment hyperplane is fit to the sorted observation vectors using a multivariable linear regression, path distances are computed between a first observation of the and a last observation of the sorted observation vectors based on a predefined number of segments, a shortest path associated with a smallest value of the computed path distances is selected, and a fit quality measure is computed for the selected shortest path. A best independent variable is selected from the independent variables based on having an extremum value for the computed fit quality measure.

30 Claims, 12 Drawing Sheets

(56) References Cited

OTHER PUBLICATIONS

Machne, Rainer et al. Piecewise Linear Segmentation by Dynamic Programming. https://cran.r-project.org/web/packages/dpseg/vignettes/dpseg.html. Oct. 8, 2020. pp. 1-18.
Quadratic Programming. Wikipedia. https://en.wikipedia.org/w/index.php?title=Quadratic_programming&oldid=1065899797. Last edited Jan. 15, 2022. pp. 1-7.
Mount, John et al. 'Rcpp' Dynamic Programming Package. Dec. 15, 2020. pp. 1-14.
SAS Institute Inc. SAS/STAT® 15.2 User's Guide. The REG Procedure. Nov. 6, 2020. Cary, NC: SAS Institute Inc. pp. 1-188.
GitHub—WinVector/RcppDynProg: Dynamic Programming implemented in Rcpp. https://github.com/WinVector/RcppDynProg. Printed on Aug. 26, 2022. pp. 1-9.

\* cited by examiner

| Obs | X1 | X2 | X3 | Y | estimate |
|---|---|---|---|---|---|
| 1 | 0.019 | 0.002 | 0.038 | 20.768 | 19.555 |
| 6 | 0.082 | 0.007 | 0.050 | 35.661 | 35.626 |
| 3 | 0.023 | 0.050 | 0.054 | 18.741 | 21.717 |
| 2 | 0.022 | 0.084 | 0.066 | 24.345 | 22.711 |
| 5 | 0.078 | 0.103 | 0.062 | 27.316 | 27.223 |
| 9 | 0.103 | 0.111 | 0.064 | 28.661 | 28.661 |
| 7 | 0.098 | 0.131 | 0.020 | 40.967 | 40.967 |
| 4 | 0.066 | 0.151 | 0.005 | 32.715 | 32.715 |
| 8 | 0.101 | 0.212 | 0.039 | 33.235 | 33.235 |

FIG. 5B

| Obs | X1 | X2 | X3 | Y | estimate |
|---|---|---|---|---|---|
| 4 | 0.066 | 0.151 | 0.005 | 32.715 | 33.1757233 |
| 7 | 0.098 | 0.131 | 0.020 | 40.967 | 40.3677732 |
| 1 | 0.019 | 0.002 | 0.038 | 20.768 | 20.5099879 |
| 8 | 0.101 | 0.212 | 0.039 | 33.235 | 33.2684406 |
| 6 | 0.082 | 0.007 | 0.050 | 35.661 | 36.0241203 |
| 3 | 0.023 | 0.050 | 0.054 | 18.741 | 18.741453 |
| 5 | 0.078 | 0.103 | 0.062 | 27.316 | 27.3156157 |
| 9 | 0.103 | 0.111 | 0.064 | 28.661 | 28.6610618 |
| 2 | 0.022 | 0.084 | 0.066 | 24.345 | 24.3451716 |

504 → (X3 column)

FIG. 5C

| 600 | 601 | 602 | 603 | 604 | 605 | 606 | 607 | 608 | 609 |
|---|---|---|---|---|---|---|---|---|---|
| x1 | 1.452% | 1.406% | 1.352% | 1.335% | 1.295% | 3.13% | 6.85% | 8.01% | 10.78% |
| x10 | 1.452% | 1.411% | 1.371% | 1.320% | 1.275% | 2.78% | 5.54% | 9.07% | 12.21% |
| x11 | 1.452% | 0.951% | 0.871% | 0.826% | 0.767% | 34.46% | 40.02% | 42.96% | 47.14% |
| x12 | 1.452% | 1.187% | 1.105% | 1.066% | 1.004% | 18.22% | 23.87% | 26.47% | 30.81% |
| x13 | 1.452% | 1.026% | 0.936% | 0.883% | 0.789% | 29.20% | 35.38% | 39.20% | 45.66% |
| x14 | 1.452% | 1.347% | 1.285% | 1.229% | 1.168% | 7.22% | 11.52% | 15.34% | 19.56% |
| x15 | 1.452% | 1.384% | 1.320% | 1.274% | 1.233% | 4.64% | 9.05% | 12.28% | 15.05% |
| x16 | 1.452% | 1.378% | 1.331% | 1.302% | 1.256% | 5.12% | 8.34% | 10.31% | 13.50% |
| x17 | 1.452% | 1.121% | 1.066% | 1.029% | 0.993% | 22.79% | 26.56% | 29.13% | 31.62% |
| x2 | 1.452% | 1.387% | 1.374% | 1.320% | 1.228% | 4.46% | 5.36% | 9.11% | 15.42% |
| x3 | 1.452% | 1.383% | 1.276% | 1.207% | 1.164% | 4.75% | 12.14% | 16.90% | 19.82% |
| x4 | 1.452% | 1.403% | 1.333% | 1.303% | 1.232% | 3.35% | 8.20% | 10.28% | 15.11% |
| x5 | 1.452% | 1.397% | 1.348% | 1.296% | 1.239% | 3.75% | 7.18% | 10.76% | 14.69% |
| x6 | 1.452% | 1.353% | 1.310% | 1.262% | 1.193% | 6.82% | 9.74% | 13.07% | 17.85% |
| x7 | 1.452% | 1.367% | 1.311% | 1.245% | 1.203% | 5.83% | 9.70% | 14.22% | 17.15% |
| x8 | 1.452% | 1.391% | 1.357% | 1.300% | 1.240% | 4.19% | 6.52% | 10.48% | 14.59% |
| x9 | 1.452% | 1.378% | 1.316% | 1.253% | 1.211% | 5.06% | 9.34% | 13.70% | 16.57% |
| Min | 1.452% | 0.951% | 0.871% | 0.828% | 0.767% | 34.46% | 40.02% | 42.96% | 47.14% |

PIECEWISE LINEARIZATION OF MULTIVARIABLE DATA

CROSS-REFERENCE TO RELATED APPLICATIONS

The present application claims the benefit of 35 U.S.C. § 119(e) to U.S. Provisional Patent Application No. 63/398,832, which was filed Aug. 17, 2022, and to U.S. Provisional Patent Application No. 63/354,420, which was filed Jun. 22, 2022, the entire contents of which are hereby incorporated by reference.

BACKGROUND

Machine learning models may be used to make decisions based on predictions across various domains such as manufacturing, healthcare, chemical processes, etc. Machine learning models are trained using collected and aggregated observations to make predictions. A set of observations may include one or more dependent variables and a plurality of independent variables. The goal of the machine learning model may be to model the relationship between the one or more dependent variables and the plurality of independent variables using a function that is fit to the observations. Various types of functions may be fit to the observations. For example, the function may be a piecewise linear function.

SUMMARY

In an example embodiment, a non-transitory computer-readable medium is provided having stored thereon computer-readable instructions that, when executed by a computing device, cause the computing device to select a piecewise linear regression model for multivariate data. A hyperplane is fit to a plurality of observation vectors using a linear multivariable regression. Each observation vector of the plurality of observation vectors includes a dependent variable value of a dependent variable and a plurality of independent variable values. Each independent variable of a plurality of independent variables is associated with a respective independent variable value of the plurality of independent variable values. A baseline fit quality measure is computed for the fit hyperplane. For each independent variable of the plurality of independent variables selected as a selected independent variable, the plurality of observation vectors are sorted based on a variable value of the selected independent variable, a plurality of contiguous segments to evaluate is defined, for each contiguous segment of the plurality of contiguous segments selected as a selected contiguous segment, a segment hyperplane is fit to the unique set of the sorted plurality of observation vectors of the selected contiguous segment using a multivariable linear regression, path distances are computed between a first observation of the sorted plurality of observation vectors and a last observation of the sorted plurality of observation vectors based on a predefined number of segments, a shortest path associated with a smallest value of the computed path distances is selected, and a fit quality measure is computed for the selected shortest path. Each contiguous segment of the plurality of contiguous segments is defined between a unique set of the sorted plurality of observation vectors. The fit quality measure is an improvement value relative to the computed baseline fit quality measure. A best independent variable is selected from the plurality of independent variables based on having an extremum value for the computed fit quality measure. An indicator of the selected best independent variable, an end value of the selected best independent variable at an end of each contiguous segment included in the selected shortest path, and, for each segment of the predefined number of segments included in the selected shortest path, a linear regression coefficient for each independent variable of the plurality of independent variables and an intercept value computed from the multivariable linear regression are output.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to select a piecewise linear regression model for multivariate data.

In an example embodiment, a method of selecting a piecewise linear regression model for multivariate data is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 5B shows a sample table of observations ordered by a second independent variable in accordance with an illustrative embodiment.

FIG. 5C shows a sample table of observations ordered by a third independent variable in accordance with an illustrative embodiment.

FIG. 6 shows a table of accuracy results for a plurality of independent variables with different numbers of piecewise linear segments in accordance with an illustrative embodiment.

DETAILED DESCRIPTION

Figure 1:
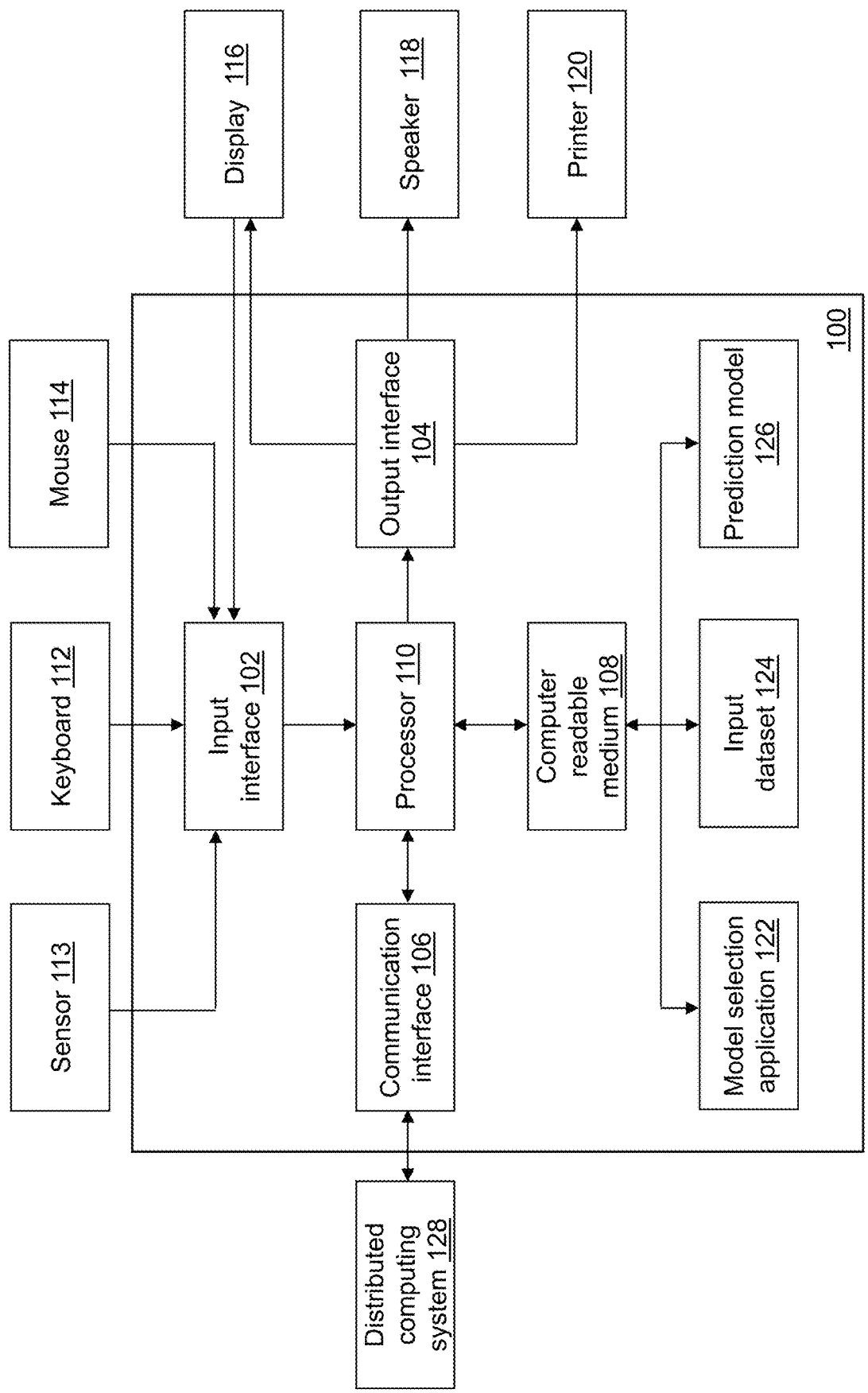
FIG. 1 depicts a block diagram of a model selection device in accordance with an illustrative embodiment.

A model selection application 122 provides an automated model selection process to identify a best piecewise linear function to describe a multivariate dataset with observations having a plurality of independent variables X that describe values for a dependent variable y. The motivation to linearize using piecewise linear functions is to approximate nonlinear performance constraints, for example, for nonlinear causal models, for a subsequent mixed integer linear programming solver where one performance model is one performance constraint. In mixed integer linear programming solver, nonlinear constraints are not acceptable. In the past, linear functions have been used to approximate the nonlinear performance constraints. Model selection application 122 uses piecewise linear functions to replace the linear functions and achieve better model accuracy.

Merely for illustration, the dependent variable y may be generated by a causal model with values of the plurality of independent variables X. For example, the values of the plurality of independent variables X may be defined from chemical experiments. For illustration, referring to FIG. 4, a piecewise linear function is shown that was fit to a dependent variable y using a single independent variable x. The diamond symbols indicate each x-y observation. A first line 400, a second line 402, and a third line 404 define three different segments of the data ordered by increasing values of the x independent variable. In the illustration, the piecewise segments are non-monotonic and discontinuous. The piecewise linear function could have been defined with a fewer or a greater number of segments. A slope value and an intercept value define each piecewise segment. Thus, a first slope value and a first intercept value define first line 400; a second slope value and a second intercept value define second line 402; and a third slope value and a third intercept value define third line 404. Each slope value defines a regression coefficient value for the case of a single independent variable.

A piecewise linear function can be fit separately to each of the plurality of x independent variables based on sequentially ordered values of the respective independent variable. For example, if there are $N_p$ independent variables, $N_p$ piecewise linear functions can be fit using a specified number of segments. Model selection application 122 fits each piecewise linear function, selects the independent variable that provides the best accuracy or accuracy improvement, and defines hyperplane characteristics (regression coefficient values, intercept value) for each segment and the segment boundaries based on the selected independent variable. The piecewise linear function has the goal of determining the independent variable of the plurality of independent variables that most accurately linearizes nonlinear performance models. Model selection application 122 may perform the computations using a plurality of threads and/or a plurality of computing devices in a distributed computing environment and using dynamic programming and quadratic programming techniques.

Referring to FIG. 1, a block diagram of a model selection device 100 is shown in accordance with an illustrative embodiment. Model selection device 100 may include an input interface 102, an output interface 104, a communication interface 106, a non-transitory computer-readable medium 108, a processor 110, model selection application 122, input dataset 124, and a prediction model 126. Model selection application 122 computes linear piecewise segments using each independent variable and selects the best independent variable and its associated linear piecewise segments to model the relationship between the independent variables and the dependent variables with increased accuracy. Fewer, different, and/or additional components may be incorporated into model selection device 100.

Input interface 102 provides an interface for receiving information from the user or another device for entry into model selection device 100 as understood by those skilled in the art. Input interface 102 may interface with various input technologies including, but not limited to, a keyboard 112, a sensor 113, a mouse 114, a display 116, a track ball, a keypad, one or more buttons, etc. to allow the user to enter information into model selection device 100 or to make selections presented in a user interface displayed on display 116.

The same interface may support both input interface 102 and output interface 104. For example, display 116 comprising a touch screen provides a mechanism for user input and for presentation of output to the user. Model selection device 100 may have one or more input interfaces that use the same or a different input interface technology. The input interface technology further may be accessible by model selection device 100 through communication interface 106.

Output interface 104 provides an interface for outputting information for review by a user of model selection device 100 and/or for use by another application or device. For example, output interface 104 may interface with various output technologies including, but not limited to, display 116, a speaker 118, a printer 120, etc. Model selection device 100 may have one or more output interfaces that use the same or a different output interface technology. The output interface technology further may be accessible by model selection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model selection device 100 may have one or more communication interfaces that use the same or a different communication interface technology. For example, model selection device 100 may support communication using an Ethernet port, a Bluetooth® antenna, a telephone jack, a USB port, etc. Data and/or messages may be transferred between model selection device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Model selection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model selection device 100 also may have one or more drives that support the loading of a memory media such as a CD, DVD, an external hard drive, etc. One or more external hard drives further may be connected to model selection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model selection device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Model selection application 122 may perform operations associated with selecting the best independent variable and its associated linear piecewise segments to model the relationship between the independent variables and the dependent variables. The selected best independent variable and its associated linear piecewise segments can be used to predict values for the dependent variables, for example, for new data such as that stored in a second input dataset 824 (shown referring to FIG. 8). Some or all of the operations described herein may be embodied in model selection application 122. The operations may be implemented using hardware, firmware, software, or any combination of these methods.

Referring to the example embodiment of FIG. 1, model selection application 122 is implemented in software (comprised of computer-readable and/or computer-executable instructions) stored in computer-readable medium 108 and accessible by processor 110 for execution of the instructions that embody the operations of model selection application 122. Model selection application 122 may be written using one or more programming languages, assembly languages, scripting languages, etc. Model selection application 122 may be integrated with other analytic tools. As an example, model selection application 122 may be part of an integrated data analytics software application and/or software architecture such as that offered by SAS Institute Inc. of Cary, N.C., USA. Merely for illustration, model selection application 122 may be implemented using or integrated with one or more SAS software tools such as Base SAS, SAS® Enterprise Miner™ SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/ORO, SAS/ETS®, SAS® Visual Analytics, SAS® Viya™, SAS® Optimization, SAS® Econometrics, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Model selection application 122 may be implemented as a Web application. For example, model selection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records or observations, and the columns may be referred to as variables. In an alternative embodiment, input dataset 124 may be transposed. Each observation vector includes values defined for each variable of a plurality of variables. The plurality of variables includes one or more dependent variables y, and a plurality of independent variables x. Each observation vector o may be defined using $o_i=\{x_{i,j}, y_i\}$, $j=1, \ldots, N_f$; $i=1, 2, \ldots, N$, where $N_f$ is a number of the plurality of independent variables x defined for each observation vector, and N is a number of the observation vectors included in input dataset 124. Input dataset 124 may include additional variables that are not included in the plurality of variables.

Sensor 113 may measure a physical quantity in an environment to which sensor 113 is associated and generate a corresponding measurement datum that may be associated with a time that the measurement datum is generated. The measurement datum may be stored in input dataset 124. Illustrative sensors include a temperature sensor, a position or location sensor, a heart rate sensor, a blood pressure sensor, a blood glucose sensor, a chemical sensor, a pressure sensor, etc. For illustration, Input dataset 124 may include data captured as a function of time. The data stored in input dataset 124 may be captured at different time points, periodically, intermittently, when an event occurs, etc. Input dataset 124 may include data captured at a high data rate such as 200 or more observation vectors per second for one or more physical objects. One or more columns of input dataset 124 may include a time and/or date value. Input dataset 124 may include data captured under normal and abnormal operating conditions of the physical object.

The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input dataset 124 may be generated as part of the IoT, where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

Input dataset 124 may be stored on computer-readable medium 108 or on one or more computer-readable media of distributed computing system 128 and accessed by model selection device 100 using communication interface 106 and/or input interface 102. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input dataset 124 may be stored using various data structures as known to those skilled in the art including one or more files of a file system, a relational database, one or more tables of a system of tables, a structured query language database, etc. on model selection device 100 or on distributed computing system 128.

Model selection device 100 may coordinate access to input dataset 124 that is distributed across distributed computing system 128 that may include one or more computing devices. For example, input dataset 124 may be stored in a cube distributed across a grid of computers as understood by a person of skill in the art. As another example, input dataset 124 may be stored in a multi-node Hadoop® class. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS Viya open, cloud-ready, in-memory architecture also may be used as an analytic platform to enable multiple users to concurrently access data stored in input dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2:
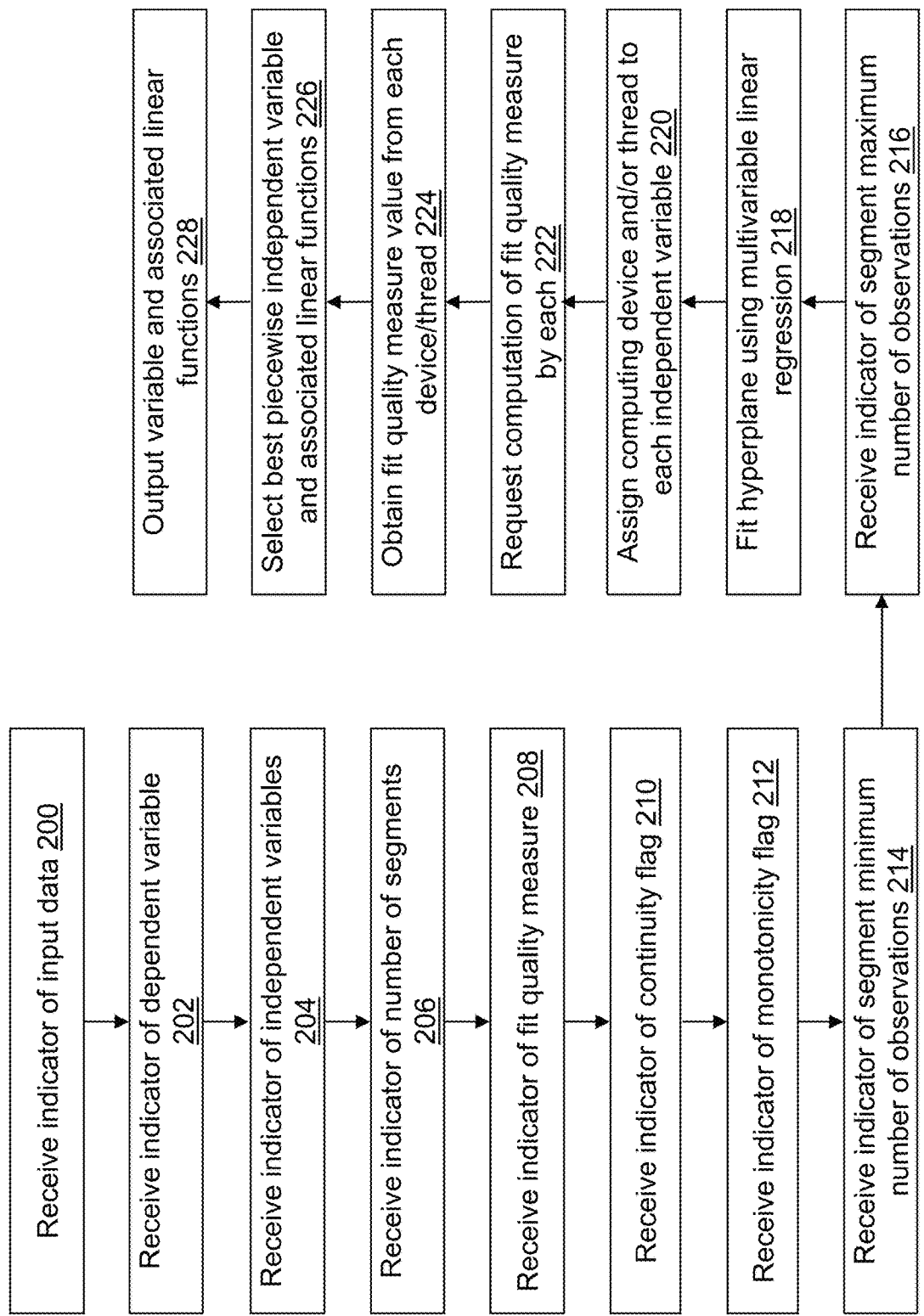
FIG. 2 depicts a flow diagram illustrating examples of operations performed by a model selection application of the model selection device of FIG. 1 in accordance with an illustrative embodiment.
Figure 3:
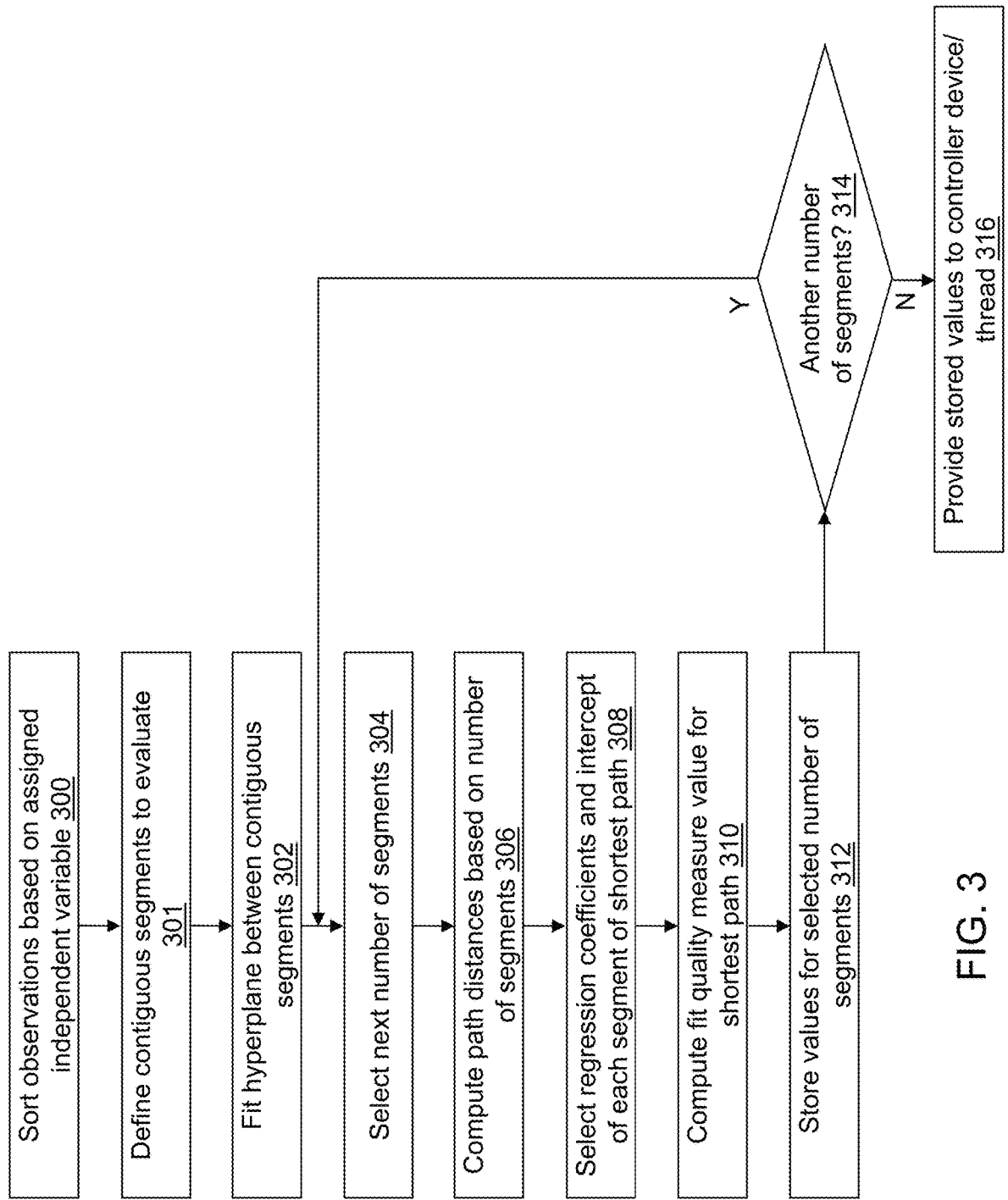
FIG. 3 depicts a flow diagram illustrating examples of operations performed by the model selection application of the model selection device of FIG. 1 in parallel in accordance with an illustrative embodiment.

Referring to FIGS. 2 and 3, example operations associated with model selection application 122 are described. Additional, fewer, or different operations may be performed depending on the embodiment of model selection application 122. The order of presentation of the operations of FIGS. 2 and 3 is not intended to be limiting. Some of the operations may not be performed in some embodiments. Although some of the operational flows are presented in sequence, the various operations may be performed in various repetitions and/or in other orders than those that are illustrated. For example, a user may execute model selection application 122, which causes presentation of a first user interface window, which may include a plurality of menus and selectors such as drop-down menus, buttons, text boxes, hyperlinks, etc. associated with model selection application 122 as understood by a person of skill in the art. The plurality of menus and selectors may be accessed in various orders. An indicator may indicate one or more user selections from a user interface, one or more data entries into a data field of the user interface, one or more data items read from a command line, one or more data items read from computer-readable medium 108, or one or more data items otherwise defined with one or more default values, etc. that are received as an input by model selection application 122. Some of the operational flows further may be performed in parallel, for example, using a plurality of threads and/or a plurality of computing devices such as may be included in distributed computing system 128.

Referring to FIG. 2, in an operation 200, a first indicator may be received that indicates input dataset 124. For example, the first indicator indicates a location and a name of input dataset 124. As an example, the first indicator may be received by model selection application 122 after selection from a user interface window or after entry by a user into a user interface window. In an alternative embodiment, input dataset 124 may not be selectable. For example, a most recently created dataset may be used automatically.

In an operation 202, a second indicator may be received that indicates the dependent variable y to use from input dataset 124. For example, the second indicator may indicate a column number or a column name. The dependent variable defines the dependent variables value $y_i$ for each observation vector.

In an operation 204, a third indicator may be received that indicates the plurality of independent variables to use from input dataset 124. For example, the third indicator may indicate a plurality of column numbers, such as a range of column numbers, or a plurality of column names. The plurality of independent variables are the variables that define each observation vector $x_i$, where $x_i = x_{i,j}$, $j=1, \ldots, N_I$, $i=1, \ldots, N \cdot x_{i,j}$ is a $j^{th}$ independent variable value for the $i^{th}$ observation vector.

In an operation 206, a fourth indicator may be received that indicates a number of segments $N_S$ in which to split each piecewise linear function. In an alternative embodiment, the fourth indicator may not be received. For example, a default value may be stored, for example, in computer-readable medium 108 and used automatically. In another alternative embodiment, the value for the number of segments $N_S$ may not be selectable. Instead, a fixed, predefined value may be used. For illustration, a default value for the number of segments $N_S$ may be $N_S=2$ though other values may be used. In an alternative embodiment, the fourth indicator may include a range of numbers of segments $N_{SN}$ and $N_{SX}$ in which to split each piecewise linear function, where $N_{SN}$ indicates a minimum number of segments to evaluate and $N_{SX}$ indicates a maximum number of segments to evaluate.

In another alternative embodiment, the values for the range of numbers of segments $N_{SN}$ and $N_{SX}$ may not be selectable. Instead, fixed, predefined range values may be used. For illustration, a default value for the range of numbers of segments may be $N_{SN}=2$ and $N_{SX}=5$ though other values may be used. Typically, when continuity is not required between successive segments, a large number of segments results in a higher accuracy though too many segments may result in overfitting to the observations.

In an operation 208, a fifth indicator of a fit quality measure may be received. In an alternative embodiment, the fifth indicator may not be received. A default fit quality measure may be stored, for example, in computer-readable medium 108 and used automatically. In another alternative embodiment, the fit quality measure may not be selectable and a single fit quality measure is implemented by model selection application 122. The fit quality measure is an indicator of a method used to compute the fit quality of each piecewise linear function. An illustrative fit quality measure may be indicated as "MAPEI" (mean absolute percent error improvement), where the fit quality measure is computed using $$q = \frac{q_b - q_p}{q_b},$$

$q_b$ indicates the value of the fit quality measure computed for a baseline function using $$q_b = \frac{1}{N}\sum_{i=1}^{N}\left|\frac{y_i - \hat{y}_i}{y_i}\right| \times 100\%,$$

$\hat{y}_i$ is a dependent value estimate using the piecewise linear function, and $q_p$ indicates the value of the fit quality for a p segment piecewise linear function using $$q_p = \frac{1}{N}\sum_{i=1}^{N}\left|\frac{y_i - \hat{y}_i}{y_i}\right| \times 100\%,$$

where a piecewise linear function is computed for each independent variable and for each number of segments evaluated.

Figure 4:
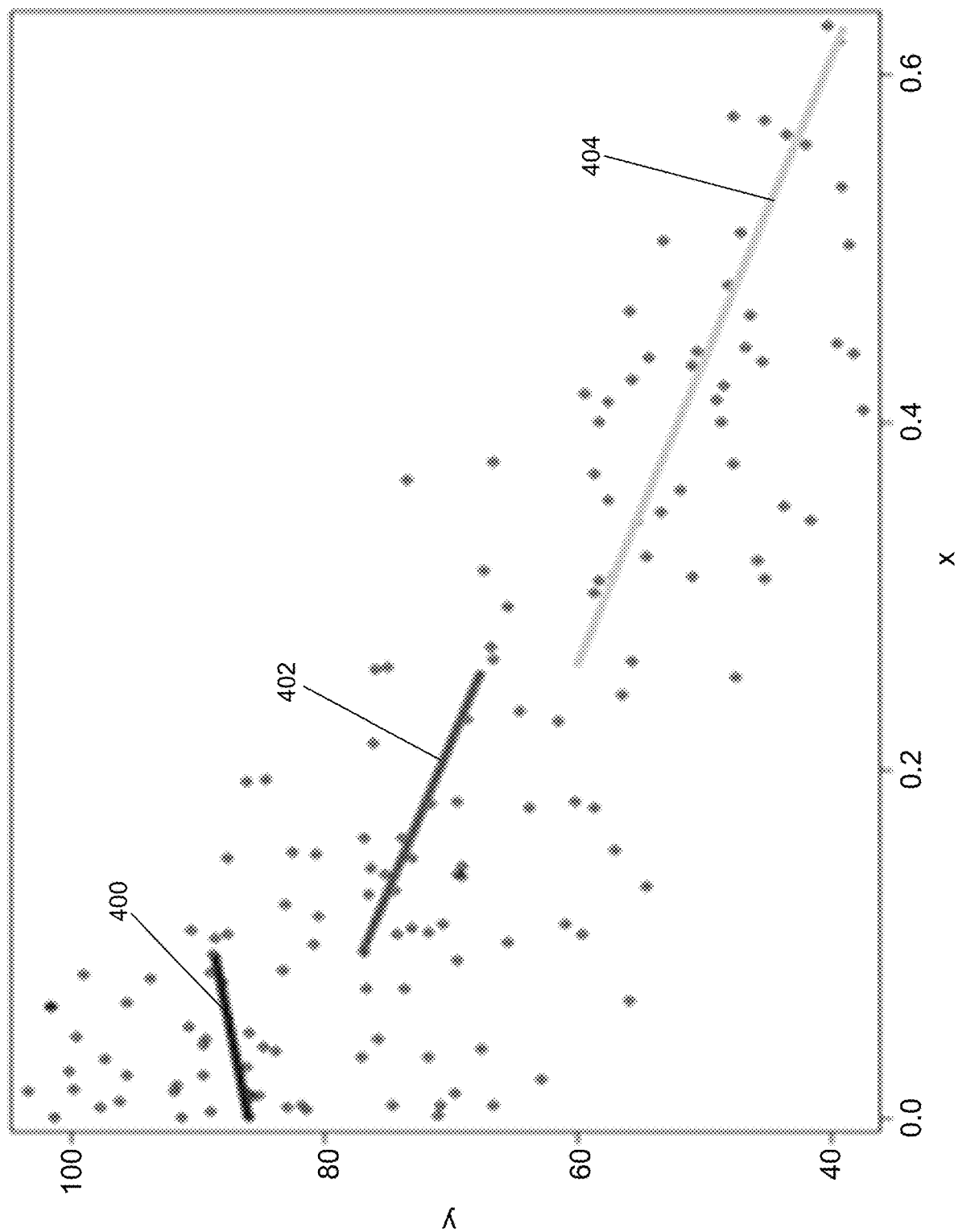
FIG. 4 shows a piecewise linear function fit observations in accordance with an illustrative embodiment.

In an operation 210, a sixth indicator of a continuity flag may be received. In an alternative embodiment, the sixth indicator may not be received. For example, a default value may be stored, for example, in computer-readable medium 108 and used automatically. In another alternative embodiment, the continuity flag may not be selectable. Instead, a fixed, predefined value may be used. The continuity flag indicates whether the piecewise linear functions must be continuous or may be discontinuous. For example, the piecewise linear functions shown in FIG. 4 are discontinuous such that the observation at the end of a previous segment is not the same observation as the start of the next segment. When the piecewise linear functions must be continuous as indicated by the continuity flag or by default, each subsequent line segment starts at the end point of the previous segment.

In an operation 212, a seventh indicator of a monotonicity flag may be received. In an alternative embodiment, the seventh indicator may not be received. For example, a default value may be stored, for example, in computer-readable medium 108 and used automatically. In another alternative embodiment, the monotonicity flag may not be selectable. Instead, a fixed, predefined value may be used. The monotonicity flag indicates whether the piecewise linear functions must have regression coefficient values that are either all positive values or all negative values. For example, the piecewise linear functions shown in FIG. 4 are not monotonic because first line 400 has a positive linear regression coefficient for the x-variable and second line 402 has a negative linear regression coefficient for the x-variable.

In an operation 214, an eighth indicator of a segment minimum number of observations $O_n$ may be received. In an alternative embodiment, the eighth indicator may not be received. For example, a default value may be stored, for example, in computer-readable medium 108 and used automatically. In another alternative embodiment, the segment minimum number of observations $O_n$ may not be selectable. Instead, the segment maximum number of observations $O_x$ may not be used. For illustration, a default value for the segment minimum number of observations $O_n$ may be $O_n=2$ though other values may be used. The segment minimum number of observations $O_n$ defines a minimum number of observations that must be included in each segment. In an operation 216, a ninth indicator of a segment maximum number of observations $O_x$ may be received. In an alternative embodiment, the ninth indicator may not be received. For example, a default value may be stored, for example, in computer-readable medium 108 and used automatically. In another alternative embodiment, the segment maximum number of observations $O_x$ may not be selectable. Instead, the segment maximum number of observations $O_x$ may not be used. For illustration, a default value for the segment maximum number of observations $O_x$ may be $O_x=N$ though other values may be used. The segment maximum number of observations $O_x$ defines a maximum number of observations that can be included in each segment. $O_x=N$ effectively removes the restriction.

In an operation 218, a hyperplane is fit to the observations included in input dataset 124 with the plurality of independent variables indicated in operation 204 and the dependent variable indicated in operation 202 using a multivariable linear regression. The hyperplane may be fit to the observations using quadratic programming. For example, a REG Procedure included in SAS/STAT 15.2® developed and provided by SAS Institute Inc. of Cary, N.C., USA may be used to compute each multivariable linear regression. A baseline fit quality measure $q_b$ is computed using $$q_b = \frac{1}{N}\sum_{i=1}^{N}\left|\frac{y_i - \hat{y}_i}{y_i}\right| \times 100\%$$

that includes the fit hyperplane that includes a single linear segment.

In an operation 220, each computing device of distributed computing system 128 and/or each thread of the computing device executing model selection application 122 is assigned an independent variable of the plurality of independent variables.

In an operation 222, computation of the fit quality measure indicated in operation 208 is requested by each computing device of distributed computing system 128 and/or each thread of the computing device executing model selection application 122 for the assigned independent variable. For example, FIG. 3 shows example operations performed in parallel by each computing device of distributed computing system 128 and/or each thread of the computing device executing model selection application 122 for the assigned independent variable. In an alternative embodiment, the operations may not be performed in parallel.

Figure 5A:
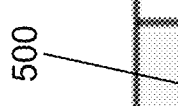
FIG. 5A shows a sample table of observations ordered by a first independent variable in accordance with an illustrative embodiment.

In an operation 300, the observations in input dataset 124 are sorted in an order of increasing value of the assigned independent variable. For example, referring to FIG. 5A, nine observations are sorted by the value of a first independent variable 500. Referring to FIG. 5B, the nine observations are sorted by the value of a second independent variable 502. Referring to FIG. 5C, the nine observations are sorted by the value of a third independent variable 504.

A single observation is used when multiple observations have the same value for the assigned independent variable so that additional observations with the same value are processed together. As a result, the number of observations to evaluate may be reduced by the removal of observations having redundant values for the assigned independent variable such that $N_e \leq N$.

In an operation 301, contiguous segments to evaluate are defined from the ordered values of the assigned independent variable considering values of the continuity flag, $O_n$, and $O_x$. For example, a dummy observation is added as a last observation of the ordered observations. The contiguous segments to evaluate define an upper triangular matrix $S(1,2), S(1,3), \ldots, S(1, N_e), S(1, N_e+1), S(2,3), S(2,4), \ldots, S(2, N_e), S(2, N_e+1), S(3,4), \ldots, S(3, N_e), S(3, N_e+1), \ldots, S(N_e, N_e+1)$, where each index into a two-dimensional score matrix S is associated with an ordered observation, where S(i,j) includes observations i, i+1, ..., j−1. For example, S(1,3) is associated with a contiguous segment between observation 1 and observation 2 of the observations ordered in operation 300, S(1,4) is associated with a contiguous segment between observation 1, observation 2, and observation 3 of the observations ordered in operation 300, and so on. Contiguous segments that do not include at least $O_n$ observations and/or less than or equal to $O_x$ observations, when one or both constraints are applied, are not included as possible segments in score matrix S. Contiguous segments that do not provide continuity between segments when the continuity flag indicates that continuity is required are not included as possible segments in the score matrix S.

In an operation 302, a segment hyperplane is fit to each possible contiguous segment to evaluate defined in operation 301 using a multivariable linear regression. The segment hyperplane may be fit to the observations associated with each respective contiguous segment to evaluate defined in operation 301 using quadratic programming and dynamic programming techniques. An objective function value is computed from each multivariable linear regression and is stored in the score matrix S using the respective indices. For example, S(1,3) may hold the objective function value for the multivariable linear regression computed between observation 1 and observation 2 of the ordered observations; S(1,4) may hold the objective function value for the multivariable linear regression computed between observation 1, observation 2, and observation 3 of the ordered observations, and so on. The starting and ending independent variable values of the assigned independent variable and/or the linear regression coefficients computed for each independent variable and the intercept value defined from the multivariable linear regression further may be stored in association with the indices for each contiguous segment to evaluate.

In an illustrative embodiment, the objective function measures the sum square error or the variance associated with each fit segment. A different objective function may be used in alternative embodiments. Each multivariable linear regression is independent of the others so the multivariable linear regressions for the contiguous segments to evaluate defined in operation 301 may be performed in parallel, for example, using a plurality of threads. For example, the REG Procedure may be used to compute each multivariable linear regression.

In an operation 304, a next number of segments m is selected. For example, the next number of segments m may be set to the number of segments $m=N_S$ or to $m=N_{SN}$ on a first iteration of operation 304. Unless a range of numbers of segments is indicated in operation 206, there is a single iteration of operation 304. For a subsequent iteration of operation 304, the next number of segments m is incremented, for example, using m=m+1.

In an operation 306, a path distance is computed given m from the values stored in the selected matrix S using dynamic programming techniques. For example, the following pseudo code determines the path distance based on the objective function values.

For $j=1, \ldots, N_e, b=1, \ldots, m$ distance$[j,b+1]$=min(distance$[i,b]$+$S(i,j))i \in N_e$ In an operation 308, the linear regression coefficients computed for each independent variable and the intercept value defined from the multivariable linear regression for each of the m segments resulting in the shortest path is selected using dynamic programming techniques. For example, the shortest path may be identified by starting from an end of the last segment that is the dummy observation and backtracking to a beginning of the first segment selecting the shortest path connected to the current observation. The following pseudo code determines the shortest path distance.

j=$N_e$+1
For b=m, ..., 1
  For i=1, ..., $N_e$
    If distance[j, b+1]=distance[i, b] +S(i, j) then do
    path={b, i, j} union path
    j=i
    exit For loop
    end
  end for
end for Illustrative dynamic programming techniques for operations 301 through 308 are described in a paper titled *Piecewise Linear Segmentation by Dynamic Programming* by Rainer Machne and Peter F. Stadler published online Oct. 8, 2020 (Machne) for a single independent variable. For example, the Machne paper describes a recursion function with a scoring function for a single independent variable based on a variance of residuals and a backtracing function to extract the shortest distance path through the contiguous segments. Monotonicity of the piecewise linear functions means that differences between the regression coefficient values of successive segments are either all positive or all negative.

In an operation 310, a fit quality measure value q is computed for the selected shortest path. For example, the fit quality measure is computed using $$q = \frac{q_b - q_p}{q_b},$$

where $$q_p = \frac{1}{N}\sum_{i=1}^{N}\left|\frac{y_i - \hat{y}_i}{y_i}\right| \times 100\%,$$

$\hat{y}_i$ is estimated from the linear functions included in the selected shortest path, and the value of $q_b$ is provided by the controller device/thread.

In an operation 312, the computed values for the selected number of segments are stored. For example, the fit quality measure value q, the value of the assigned independent variable at the start and end of each segment, the linear regression coefficients computed for each independent variable and the intercept value defined from the multivariable linear regression for each of the m segments resulting in the shortest path may be stored in computer readable medium 108 or another computer readable medium of a respective computing device of distributed computing system 128.

In an operation 314, a determination is made concerning whether there is another number of segments for which to determine linear functions. When there is another number of segments, processing continues in operation 304. When there is not another number of segments, processing continues in an operation 316. For example, there is another number of segments when $m<N_{SX}$.

In operation 316, the values stored in operation 312 for each of the selected next number of segments is provided to the controller device/thread and processing continues in operation 224. For example, the values may be returned to the controller device/thread or an indicator of completion may be returned to the controller device/thread and the controller device/thread may be provided the values by accessing the values from a known computer readable medium storage location. Faster processing is provided by using a plurality of threads and/or a plurality of computing devices to compute the fit quality measure for each independent variable in parallel.

In an operation 224, the fit quality measure is obtained from each computing device of distributed computing system 128 and/or each thread of the computing device executing model selection application 122. For example, the fit quality measure may be received from each computing device of distributed computing system 128 and/or each thread of the computing device executing model selection application 122. As another alternative, the fit quality measure may be stored in a memory location known to and accessible by the computing device executing model selection application 122.

In an operation 226, a best piecewise independent variable is selected using the fit quality measure obtained for each independent variable of the plurality of independent variables. For example, the independent variable of the plurality of independent variables associated with a maximum value of the fit quality measure may be selected when the fit quality measure indicated in operation 208 was MAPEI. The linear functions associated with the selected independent variable are also selected to define the best piecewise linear function to use to model the dependent variable. The boundary values of the selected independent variable are further identified to indicate which piecewise linear function is used to compute the dependent variable value.

In an operation 228, the selected independent variable, the fit quality measure value, the value of the selected independent variable at the start and end of each segment, the linear regression coefficients computed for each independent variable and the intercept value defined from the multivariable linear regression for each of the m segments for the selected independent variable are output. For example, the selected independent variable, the fit quality measure value, the value of the selected independent variable at the start and end of each segment, the linear regression coefficients computed for each independent variable and the intercept value defined from the multivariable linear regression for a specified number of segments for the selected independent variable may be stored to prediction model 126.

Referring to FIG. 6, a first column 600 indicates an independent variable of the plurality of independent variables, a second column 601 indicates the value of the fit quality computed in operation 218 using $$q_b = \frac{1}{N}\sum_{i=1}^{N}\left|\frac{y_i - \hat{y}_i}{y_i}\right| \times 100\%$$

that includes a single linear segment, a third column 602 indicates the value of the fit quality $$q_2 = \frac{1}{N}\sum_{i=1}^{N}\left|\frac{y_i - \hat{y}_i}{y_i}\right| \times 100\%$$

with the number of segments equal to two for each respective independent variable, a fourth column 603 indicates the value of the fit quality $$q_3 = \frac{1}{N}\sum_{i=1}^{N}\left|\frac{y_i - \hat{y}_i}{y_i}\right| \times 100\%$$

with the number of segments equal to three for each respective independent variable, a fifth column 604 indicates the value of the fit quality $$q_4 = \frac{1}{N}\sum_{i=1}^{N}\left|\frac{y_i - \hat{y}_i}{y_i}\right| \times 100\%$$

with the number of segments equal to four for each respective independent variable, a sixth column 605 indicates the value of the fit quality $$q_5 = \frac{1}{N}\sum_{i=1}^{N}\left|\frac{y_i - \hat{y}_i}{y_i}\right| \times 100\%$$

with the number of segments equal to five for each respective independent variable, a seventh column 606 indicates the value of the fit quality $$q = \frac{q_b - q_2}{q_b}$$

with the number of segments equal to two for each respective independent variable, an eighth column 607 indicates the value of the fit quality $$q = \frac{q_b - q_3}{q_b}$$

with the number of segments equal to three for each respective independent variable, a ninth column 608 indicates the value of the fit quality $$q = \frac{q_b - q_4}{q_b}$$

with the number of segments equal to four for each respective independent variable, and a tenth column 609 indicates the value of the fit quality $$q = \frac{q_b - q_5}{q_b}$$

with the number of segments equal to five for each respective independent variable. The independent variable that provided the maximum value of q was independent variable ×11. As expected, the fit quality increased with increasing numbers of segments. As a result, the maximum value of q was provided using five linear segments.

Figure 7A:
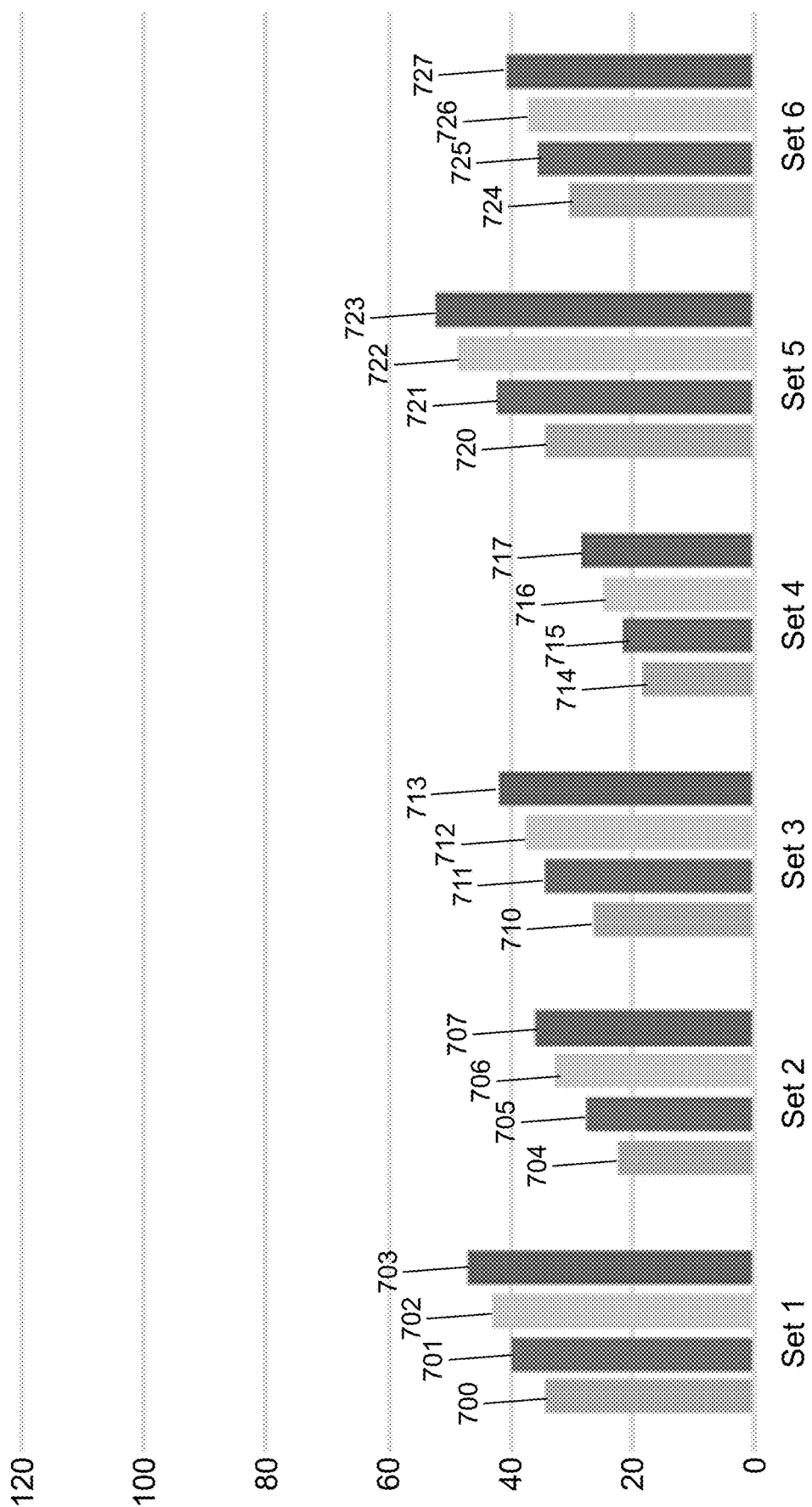
FIGS. 7A and 7B show accuracy improvements using different numbers of piecewise linear segments with twelve different sets of observations in accordance with an illustrative embodiment.
Figure 7B:
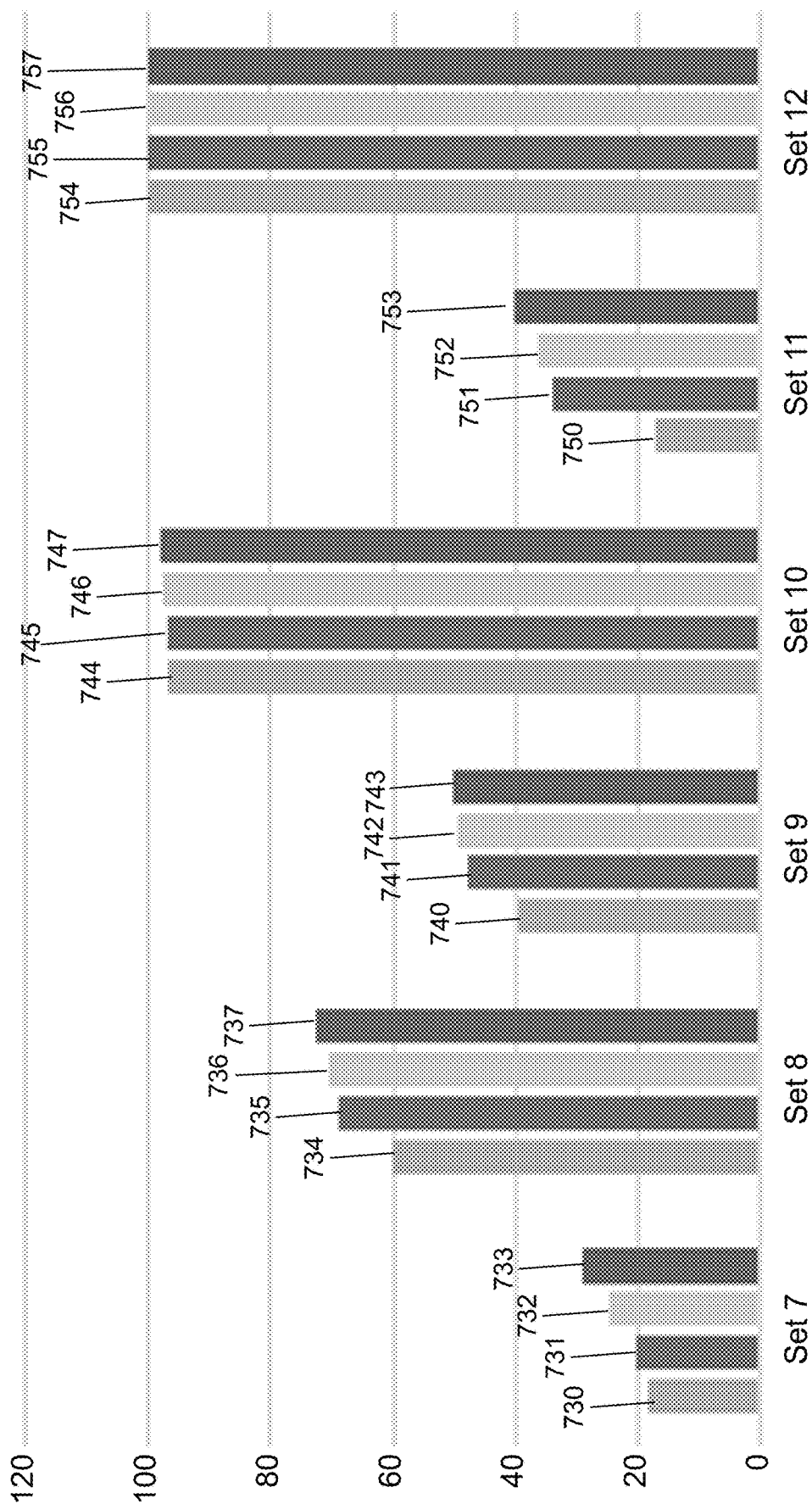

Referring to FIGS. 7A and 7B, the maximum MAPEI values using a range of numbers of segments from 2 to 5 for 12 different input datasets is shown in accordance with an illustrative embodiment. A histogram bar for each combination is shown in Table I below.

Table I

| Dataset | 2 segments | 3 segments | 4 segments | 5 segments |
|---|---|---|---|---|
| 1 | bar 700 | bar 701 | bar 702 | bar 703 |
| 2 | bar 704 | bar 705 | bar 706 | bar 707 |
| 3 | bar 710 | bar 711 | bar 712 | bar 713 |
| 4 | bar 714 | bar 715 | bar 716 | bar 717 |
| 5 | bar 720 | bar 721 | bar 722 | bar 723 |
| 6 | bar 724 | bar 725 | bar 726 | bar 727 |
| 7 | bar 730 | bar 731 | bar 732 | bar 733 |
| 8 | bar 734 | bar 735 | bar 736 | bar 737 |
| 9 | bar 740 | bar 741 | bar 742 | bar 743 |
| 10 | bar 744 | bar 745 | bar 746 | bar 747 |
| 11 | bar 750 | bar 751 | bar 752 | bar 753 |
| 12 | bar 754 | bar 755 | bar 756 | bar 757 |

The piecewise linear functions consistently provide greater than ~20% improvement in comparison to the fit quality computed in operation 218 using $$q_b = \frac{1}{N} \sum_{i=1}^{N} \left| \frac{y_i - \hat{y}_i}{y_i} \right| \times 100\%$$

that includes a single linear segment. The greater the non-linearity of the independent variables the greater the improvement.

Figure 8:
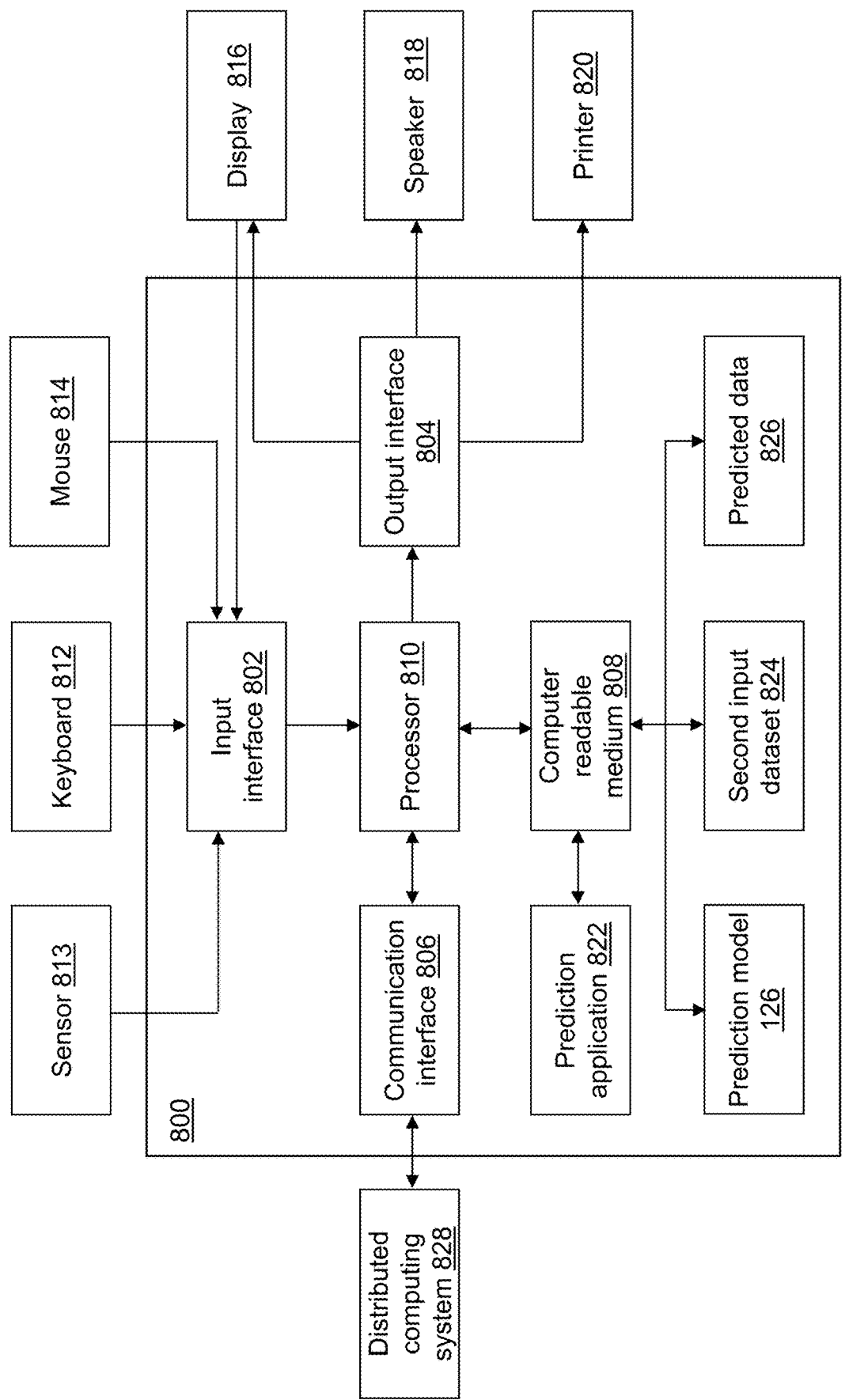
FIG. 8 depicts a block diagram of a prediction device in accordance with an illustrative embodiment.

Referring to FIG. 8, a block diagram of a prediction device 800 is shown in accordance with an illustrative embodiment. Prediction device 800 may include a second input interface 802, a second output interface 804, a second communication interface 806, a second non-transitory computer-readable medium 808, a second processor 810, a prediction application 822, second input dataset 824, prediction model 126, and predicted data 826. Fewer, different, and/or additional components may be incorporated into prediction device 800. Prediction device 800 and model selection device 100 may be the same or different devices.

Second input interface 802 provides the same or similar functionality as that described with reference to input interface 102 of model selection device 100 though referring to prediction device 800. Second output interface 804 provides the same or similar functionality as that described with reference to output interface 104 of model selection device 100 though referring to prediction device 800. Second communication interface 806 provides the same or similar functionality as that described with reference to communication interface 106 of model selection device 100 though referring to prediction device 800. Data and messages may be transferred between prediction device 800 and a distributed computing system 828 using second communication interface 806. Distributed computing system 128 and distributed computing system 828 may be the same or different computing systems. Second computer-readable medium 808 provides the same or similar functionality as that described with reference to computer-readable medium 108 of model selection device 100 though referring to prediction device 800. Second processor 810 provides the same or similar functionality as that described with reference to processor 110 of model selection device 100 though referring to prediction device 800.

Prediction application 822 performs operations associated with using the prediction model description stored in prediction model 126 to predict dependent variable values for independent variable values read from second input dataset 824 that are stored in predicted data 826. Some or all of the operations described herein may be embodied in prediction application 822. The operations may be implemented using hardware, firmware, software, or any combination of these methods.

Referring to the example embodiment of FIG. 8, prediction application 822 is implemented in software (comprised of computer-readable and/or computer-executable instructions) stored in second computer-readable medium 808 and accessible by second processor 810 for execution of the instructions that embody the operations of prediction application 822. Prediction application 822 may be written using one or more programming languages, assembly languages, scripting languages, etc. Similar to model selection application 122, prediction application 822 may be integrated with other analytic tools. Prediction application 822 and model selection application 122 may be the same or different applications that are integrated in various manners to generate fair predictions. Prediction application 822 may be implemented as a Web application.

Input dataset 124 and second input dataset 824 may be generated, stored, and accessed using the same or different mechanisms. Similar to input dataset 124, second input dataset 824 may include a plurality of rows and a plurality of columns with the plurality of rows referred to as observations or records, and the columns referred to as variables that are associated with an observation. Second input dataset 824 may be transposed. Second input dataset 824 may not include values for the dependent variable.

Similar to input dataset 124, second input dataset 824 may be stored on second computer-readable medium 808 or on one or more computer-readable media of distributed computing system 828 and accessed by prediction device 800 using second communication interface 806. Data stored in second input dataset 824 may be a sensor measurement or a data communication value, for example, from a sensor 813, may be generated or captured in response to occurrence of an event or a transaction, generated by a device such as in response to an interaction by a user with the device, for example, from a second keyboard 812 or a second mouse 814, etc.

The data stored in second input dataset 824 may be captured at different time points, periodically, intermittently, when an event occurs, etc. One or more columns may include a time value. Similar to input dataset 124, data stored in second input dataset 824 may be generated as part of the IoT, and some or all data may be pre- or post-processed by an ESPE.

Second input dataset 824 further may be stored using various structures as known to those skilled in the art including a file system, a relational database, a system of tables, a structured query language database, etc. on prediction device 800 and/or on distributed computing system 828. Prediction device 800 may coordinate access to second input dataset 824 that is distributed across a plurality of computing devices that make up distributed computing system 828. For example, second input dataset 824 may be stored in a cube distributed across a grid of computers as understood by a person of skill in the art. As another example, second input dataset 824 may be stored in a multi-node Hadoop® cluster. As another example, second input dataset 824 may be stored in a cloud of computers and accessed using cloud computing technologies, as understood by a person of skill in the art.

Figure 9:
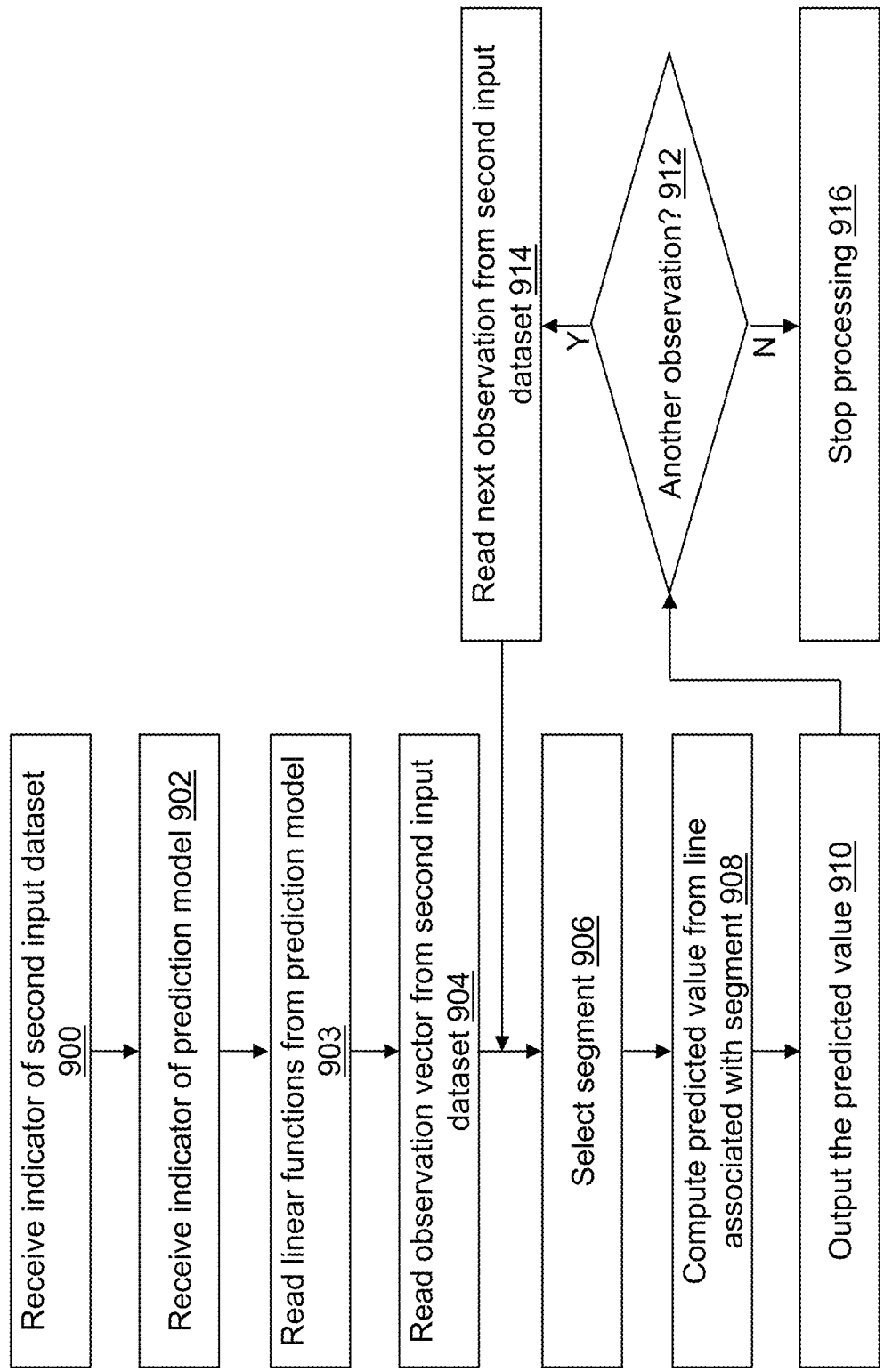
FIG. 9 depicts a flow diagram illustrating examples of operations performed by a prediction application of the prediction device of FIG. 8 in accordance with an illustrative embodiment.

Referring to FIG. 9, example operations of prediction application 822 are described to predict dependent variables values for observation vectors read from second input dataset 824. Additional, fewer, or different operations may be performed depending on the embodiment of prediction application 822. The order of presentation of the operations of FIG. 8 is not intended to be limiting. Although some of the operational flows are presented in sequence, the various operations may be performed in various repetitions, concurrently (in parallel, for example, using threads and/or distributed computing system 828), and/or in other orders than those that are illustrated.

In an operation 900, a tenth indicator may be received that indicates second input dataset 824. For example, the eighteenth indicator indicates a location and a name of second input dataset 824. As an example, the tenth indicator may be received by prediction application 822 after selection from a user interface window or after entry by a user into a user interface window. In an alternative embodiment, second input dataset 824 may not be selectable. For example, a most recently created dataset may be used automatically.

In an operation 902, an eleventh indicator may be received that indicates prediction model 126. For example, the eleventh indicator indicates a location and a name of prediction model 126. As an example, the eleventh indicator may be received by prediction application 822 after selection from a user interface window or after entry by a user into a user interface window. In an alternative embodiment, prediction model 126 may not be selectable. For example, a most recently created model configuration may be used automatically. As another example, prediction model 126 may be provided automatically as part of integration with model selection application 122.

In an operation 903, a piecewise linear model may be read from prediction model 126. For example, the piecewise linear model may have the form When $x_1 < x_{1,1}$ then $$y = intercept1 + \sum_{i=1}^{N_p} \alpha_{i,1} x_i$$

else

When $x_1 < x_{1,2}$ then $$y = intercept2 + \sum_{i=1}^{N_p} \alpha_{i,2} x_i$$

else $$y = interceptm + \sum_{i=1}^{N_p} \alpha_{i,m} x_i$$

where $x_1$ indicates a current value of the selected best piecewise independent variable, $x_{1,1}$ indicates a value of the selected best piecewise independent variable at an end of the first segment, $x_{1,2}$ indicates a value of the selected best piecewise independent variable at an end of the second segment, intercept1 indicates a value of the intercept for the first segment, intercept2 indicates a value of the intercept for the second segment, interceptm indicates a value of the intercept for the last segment, $\alpha_{i,1}$ indicates a value of the linear regression coefficient for a respective independent variable for the first segment, $\alpha_{i,2}$ indicates a value of the linear regression coefficient for the respective independent variable for the second segment, $\alpha_{i,m}$ indicates a value of the linear regression coefficient for the respective independent variable for the last segment, and $x_i$ indicates a value of the respective independent variable.

In an operation 904, an observation vector is read from second input dataset 824. The observation vector defines a value for each $x_i$, i=1, . . . ,$N_p$.

In an operation 906, a segment is selected based on the value of the selected independent variable test. For example, when $x_1 \geq x_{1,1}$ and $x_1 < x_{1,2}$, the second segment is selected.

In an operation 908, a value is predicted for the dependent variable using the equation associated with the selected segment. For example, when $x_1 \geq x_{1,1}$ and $x_1 < x_{1,2}$, the equation $$y = intercept2 + \sum_{i=1}^{N_p} \alpha_{i,2} x_i$$

is used to compute the value for the dependent variable y.

In an operation 910, the predicted dependent variable value may be output, for example, by storing the predicted dependent variable value optionally with the observation vector $x_i$, i=1, . . . , $N_p$ to predicted data 826. In addition, or in the alternative, the predicted dependent variable value may be presented on a second display 816, printed on a second printer 820, sent to another computing device using second communication interface 806, an alarm or other alert signal may be sounded through a second speaker 818, etc.

In an operation 912, a determination is made concerning whether or not second input dataset 824 includes another observation vector. When second input dataset 824 includes another observation vector, processing continues in an operation 914. When second input dataset 824 does not include another observation vector, processing continues in an operation 916.

In operation 914, a next observation vector is read from second input dataset 824, and processing continues in operation 906.

In operation 916, processing stops.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   fit a hyperplane to a plurality of observation vectors using a linear multivariable regression, wherein each observation vector of the plurality of observation vectors includes a dependent variable value of a dependent variable and a plurality of independent variable values, wherein each independent variable of a plurality of independent variables is associated with a respective independent variable value of the plurality of independent variable values;
   compute a baseline fit quality measure for the fit hyperplane;
   (A) for each independent variable of the plurality of independent variables selected as a selected independent variable, train a piecewise linear model by
      sorting the plurality of observation vectors based on a variable value of the selected independent variable;
      defining a plurality of contiguous segments to evaluate, wherein each contiguous segment of the plurality of contiguous segments is defined between a unique set of the sorted plurality of observation vectors;
      for each contiguous segment of the plurality of contiguous segments selected as a selected contiguous segment, fitting a segment hyperplane to the unique set of the sorted plurality of observation vectors of the selected contiguous segment using a multivariable linear regression;
      computing path distances between a first observation of the sorted plurality of observation vectors and a last observation of the sorted plurality of observation vectors based on the fit segment hyperplanes and a predefined number of segments;
      selecting a shortest path associated with a smallest value of the computed path distances; and
      computing a fit quality measure for the selected shortest path, wherein the fit quality measure is an improvement value relative to the computed baseline fit quality measure, wherein (A) is performed for each independent variable of the plurality of independent variables in parallel using a plurality of threads;
   (B) select a best piecewise linear model from the piecewise linear models trained in (A) based on having an extremum value for the computed fit quality measure; and
   (C) output the selected best piecewise linear model, wherein the selected best piecewise linear model comprises an indicator of the independent variable associated with the selected best piecewise linear model, an end value of the independent variable associated with the selected best piecewise linear model at an end of each contiguous segment included in the selected shortest path, and, for each segment of the predefined number of segments included in the selected shortest path associated with the selected best piecewise linear model, a linear regression coefficient for each independent variable of the plurality of independent variables and an intercept value computed from the multivariable linear regression.

2. The non-transitory computer-readable medium of claim 1, wherein a path distance is computed from an objective function value of the fit segment hyperplane.

3. The non-transitory computer-readable medium of claim 1, wherein a start value of the independent variable associated with the selected best piecewise linear model at a start of each contiguous segment included in the selected shortest path is further output.

4. The non-transitory computer-readable medium of claim 1, wherein the extremum value is a maximum value.

5. The non-transitory computer-readable medium of claim 1, wherein, after (B), the computer-readable instructions further cause the computing device to:
   read a new observation vector from a dataset, wherein the new observation vector includes an independent variable value for each independent variable of the plurality of independent variables;
   select a segment by comparing the independent variable value of the selected best independent variable to the end value of each contiguous segment included in the selected shortest path;
   compute a predicted dependent variable value for the read new observation vector using the linear regression coefficient for each independent variable of the plurality of independent variables and the intercept value associated with the selected segment; and
   output the predicted dependent variable value for the read new observation vector.

6. The non-transitory computer-readable medium of claim 5, wherein the predicted dependent variable value is computed using $$y = \text{intercept} + \sum_{i=1}^{N_p} \alpha_i x_i,$$

where y indicates the predicted dependent variable value, intercept indicates the intercept value associated with the selected segment, $\alpha_i$ indicates an $i^{th}$ linear regression coefficient associated with the selected segment, $x_i$ indicates an $i^{th}$ independent variable value, and $N_p$ indicates a number of the plurality of independent variables.

7. The non-transitory computer-readable medium of claim 1, wherein each contiguous segment of the plurality of contiguous segments is defined by an intercept value and a linear regression coefficient computed for each independent variable of the plurality of independent variables.

8. The non-transitory computer-readable medium of claim 1, wherein the plurality of observation vectors is sorted by increasing value of the selected independent variable.

9. The non-transitory computer-readable medium of claim 1, wherein the plurality of observation vectors is sorted by decreasing value of the selected independent variable.

10. The non-transitory computer-readable medium of claim 1, wherein an independent variable of the plurality of independent variables is assigned to each thread of the plurality of threads by a controller thread.

11. The non-transitory computer-readable medium of claim 10, wherein fitting the hyperplane and computing the baseline fit quality measure are performed by the controller thread.

12. The non-transitory computer-readable medium of claim 11, wherein an indicator of the selected independent variable is provided by the controller thread to each thread of the plurality of threads.

13. The non-transitory computer-readable medium of claim 11, wherein the computed baseline fit quality measure is provided by the controller thread to each thread of the plurality of threads.

14. The non-transitory computer-readable medium of claim 13, wherein a respective computed fit quality measure for the selected shortest path is provided by each thread of plurality of threads to the controller thread.

15. The non-transitory computer-readable medium of claim 14, wherein (B) and (C) are performed by the controller thread.

16. The non-transitory computer-readable medium of claim 1, wherein (A) is further performed in parallel using a plurality of computing devices.

17. The non-transitory computer-readable medium of claim 1, wherein the fit quality measure is a mean absolute percent error improvement relative to the computed baseline fit quality measure.

18. The non-transitory computer-readable medium of claim 17, wherein the mean absolute percent error improvement is computed using $$q = \frac{q_b - q_p}{q_b},$$

where q indicates the mean absolute percent error improvement, $q_b$ indicates the computed baseline fit quality measure, and $q_p$ indicates the fit quality measure computed for the selected shortest path.

19. The non-transitory computer-readable medium of claim 18, wherein the baseline fit quality measure is computed using $$q_b = \frac{1}{N} \sum_{i=1}^{N} \left| \frac{y_i - \hat{y}_i}{y_i} \right| \times 100\%,$$

where N is a number of observation vectors of the plurality of observation vectors, $y_i$ is an $i^{th}$ dependent variable value, and $\hat{y}_i$ is an $i^{th}$ dependent value estimate computed using the fit hyperplane.

20. The non-transitory computer-readable medium of claim 19, wherein the fit quality measure is computed using $$q_p = \frac{1}{N} \sum_{i=1}^{N} \left| \frac{y_i - \hat{y}_{i,p}}{y_i} \right| \times 100\%,$$

where $\hat{y}_{i,p}$ is an $i^{th}$ dependent value estimate computed based on contiguous segments associated with the selected shortest path.

21. A computing device comprising:
a processor; and
a non-transitory computer-readable medium operably coupled to the processor, the computer-readable medium having computer-readable instructions stored thereon that, when executed by the processor, cause the computing device to
fit a hyperplane to a plurality of observation vectors using a linear multivariable regression, wherein each observation vector of the plurality of observation vectors includes a dependent variable value of a dependent variable and a plurality of independent variable values, wherein each independent variable of a plurality of independent variables is associated with a respective independent variable value of the plurality of independent variable values;
compute a baseline fit quality measure for the fit hyperplane;
(A) for each independent variable of the plurality of independent variables selected as a selected independent variable train a piecewise linear model by
sorting the plurality of observation vectors based on a variable value of the selected independent variable;
defining a plurality of contiguous segments to evaluate, wherein each contiguous segment of the plurality of contiguous segments is defined between a unique set of the sorted plurality of observation vectors;
for each contiguous segment of the plurality of contiguous segments selected as a selected contiguous segment, fitting a segment hyperplane to the unique set of the sorted plurality of observation vectors of the selected contiguous segment using a multivariable linear regression;
computing path distances between a first observation of the sorted plurality of observation vectors and a last observation of the sorted plurality of observation vectors based on the fit segment hyperplanes and a predefined number of segments;
selecting a shortest path associated with a smallest value of the computed path distances; and
computing a fit quality measure for the selected shortest path, wherein the fit quality measure is an improvement value relative to the computed baseline fit quality measure, wherein (A) is performed for each independent variable of the plurality of independent variables in parallel using a plurality of threads;
(B) select a best piecewise linear model from the piecewise linear models trained in (A) based on having an extremum value for the computed fit quality measure; and
(C) output the selected best piecewise linear model, wherein the selected best piecewise linear model comprises an indicator of the independent variable associated with the selected best piecewise linear model, an end value of the independent variable associated with the selected best piecewise linear model at an end of each contiguous segment included in the selected shortest path, and, for each segment of the predefined number of segments included in the selected shortest path associated with the selected best piecewise linear model.

22. A method of selecting a piecewise linear regression model for multivariable data, the method comprising:

fitting, by a computing device, a hyperplane to a plurality of observation vectors using a linear multivariable regression, wherein each observation vector of the plurality of observation vectors includes a dependent variable value of a dependent variable and a plurality of independent variable values, wherein each independent variable of a plurality of independent variables is associated with a respective independent variable value of the plurality of independent variable values;

computing, by the computing device, a baseline fit quality measure for the fit hyperplane;

(A) for each independent variable of the plurality of independent variables selected as a selected independent variable, train a piecewise linear model by sorting, by the computing device, the plurality of observation vectors based on a variable value of the selected independent variable;

defining, by the computing device, a plurality of contiguous segments to evaluate, wherein each contiguous segment of the plurality of contiguous segments is defined between a unique set of the sorted plurality of observation vectors;

for each contiguous segment of the plurality of contiguous segments selected as a selected contiguous segment, fitting, by the computing device, a segment hyperplane to the unique set of the sorted plurality of observation vectors of the selected contiguous segment using a multivariable linear regression;

computing, by the computing device, path distances between a first observation of the sorted plurality of observation vectors and a last observation of the sorted plurality of observation vectors based on the fit segment hyperplanes and a predefined number of segments;

selecting, by the computing device, a shortest path associated with a smallest value of the computed path distances; and computing, by the computing device, a fit quality measure for the selected shortest path, wherein the fit quality measure is an improvement value relative to the computed baseline fit quality measure, wherein (A) is performed for each independent variable of the plurality of independent variables in parallel using a plurality of threads;

(B) selecting, by the computing device, a best piecewise linear model from the piecewise linear models trained in (A) based on having an extremum value for the computed fit quality measure; and (C) outputting, by the computing device, the selected best piecewise linear model, wherein the selected best piecewise linear model comprises an indicator of the independent variable associated with the selected best piecewise linear model, an end value of the independent variable associated with the selected best piecewise linear model at an end of each contiguous segment included in the selected shortest path, and, for each segment of the predefined number of segments included in the selected shortest path associated with the selected best piecewise linear model.

23. The method of claim 22, wherein a path distance is computed from an objective function value of the fit segment hyperplane.

24. The method of claim 22, wherein each contiguous segment of the plurality of contiguous segments is defined by an intercept value and a linear regression coefficient computed for each independent variable of the plurality of independent variables.

25. The method of claim 22, wherein an independent variable of the plurality of independent variables is assigned to each thread of the plurality of threads by a controller thread.

26. The method of claim 22, wherein (A) is further performed in parallel using a plurality of computing devices.

27. The method of claim 22, wherein the fit quality measure is a mean absolute percent error improvement relative to the computed baseline fit quality measure.

28. The method of claim 27, wherein the mean absolute percent error improvement is computed using $$q = \frac{q_b - q_p}{q_b},$$

where q indicates the mean absolute percent error improvement, $q_b$ indicates the computed baseline fit quality measure, and $q_p$ indicates the fit quality measure computed for the selected shortest path.

29. The method of claim 28, wherein the baseline fit quality measure is computed using $$q_b = \frac{1}{N} \sum_{i=1}^{N} \left| \frac{y_i - \hat{y}_i}{y_i} \right| \times 100\%,$$

where N is a number of observation vectors of the plurality of observation vectors, $y_i$ is an $i^{th}$ dependent variable value, and $\hat{y}_i$ is an $i^{th}$ dependent value estimate computed using the fit hyperplane.

30. The method of claim 29, wherein the fit quality measure is computed using $$q_p = \frac{1}{N} \sum_{i=1}^{N} \left| \frac{y_i - \hat{y}_{i,p}}{y_i} \right| \times 100\%,$$

where $\hat{y}_{i,p}$ is an $i^{th}$ dependent value estimate computed based on contiguous segments associated with the selected shortest path.

* * * * *

UNITED STATES PATENT AND TRADEMARK OFFICE
CERTIFICATE OF CORRECTION

PATENT NO. : 11,645,359 B1
APPLICATION NO. : 17/938692
DATED : May 9, 2023
INVENTOR(S) : Wei Xu et al.

It is certified that error appears in the above-identified patent and that said Letters Patent is hereby corrected as shown below:

On the Title Page

IN THE ABSTRACT, Lines 9-11:
Delete the phrase "path distances are computed between a first observation of the and a last observation of the sorted observation vectors" and replace with --path distances are computed between a first observation and a last observation of the sorted observation vectors--.

In the Specification

Column 6, Line 10:
Delete the phrase "SAS/ORO," and replace with --SAS/OR®,--.

Column 8, Line 51:
Delete the phrase "$N \cdot x_{i,j}$" and replace with --$N. x_{i,j}$--.

Column 12, Line 25:
Delete the phrase "$distance[j, b + 1] = \min(distance[i, b] + S(i,j)) i \in N_e$" and replace with
$$distance[j, b+1] = \min_{i \in N_e}(distance[i,b] + S(i,j))$$
-- --.

Signed and Sealed this
Fifteenth Day of August, 2023

Katherine Kelly Vidal
*Director of the United States Patent and Trademark Office*